United States Patent
Pytlarz

(10) Patent No.: US 11,361,699 B2
(45) Date of Patent: Jun. 14, 2022

(54) DISPLAY MAPPING FOR HIGH DYNAMIC RANGE IMAGES ON POWER-LIMITING DISPLAYS

(71) Applicant: DOLBY LABORATORIES LICENSING CORPORATION, San Francisco, CA (US)

(72) Inventor: Jaclyn Anne Pytlarz, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/276,752

(22) PCT Filed: Sep. 17, 2019

(86) PCT No.: PCT/US2019/051419
§ 371 (c)(1),
(2) Date: Mar. 16, 2021

(87) PCT Pub. No.: WO2020/060980
PCT Pub. Date: Mar. 26, 2020

(65) Prior Publication Data
US 2022/0044615 A1   Feb. 10, 2022

Related U.S. Application Data

(60) Provisional application No. 62/732,123, filed on Sep. 17, 2018.

(30) Foreign Application Priority Data

Sep. 17, 2018  (EP) ..................... 18194858

(51) Int. Cl.
G09G 3/20   (2006.01)
G06T 5/00   (2006.01)
(Continued)

(52) U.S. Cl.
CPC .......... G09G 3/2007 (2013.01); G06T 5/009 (2013.01); G09G 5/005 (2013.01);
(Continued)

(58) Field of Classification Search
CPC combination set(s) only.
See application file for complete search history.

(56) References Cited

U.S. PATENT DOCUMENTS

| 8,179,363 B2 | 5/2012 | Kerofsky |
| 8,223,113 B2 | 7/2012 | Kerofsky |

(Continued)

FOREIGN PATENT DOCUMENTS

| CN | 105989169 B | 10/2016 |
| CN | 107211076 B | 9/2017 |

(Continued)

OTHER PUBLICATIONS

"Study Group Report High-Dynamic-Range (HDR) Imaging Ecosystem" Sep. 19, 2015, pp. 1-54.

(Continued)

*Primary Examiner* — Wesner Sajous

(57) ABSTRACT

Methods and systems for mapping images from a first dynamic range to a second dynamic on a target display with power limitations are described. Given: an input image in a first dynamic range, input metadata (Smin, Smid, Smax), power-independent luminance characteristics of a target display (Tmin, reference Tmax), and an APL function of the target display, wherein the APL function determines output luminance in the target display as a function of average picture level (APL) input in the target display, a processor generates an adaptive output of the maximum luminance level for the target display (Tmax) so that when mapping the image from the first dynamic range to the second dynamic (Continued)

range, the anchor points of the tone-mapping function are adjusted according to the APL function of the target display.

9 Claims, 6 Drawing Sheets

(51) Int. Cl.
*G09G 5/00* (2006.01)
*G09G 3/34* (2006.01)
*H04N 1/60* (2006.01)
*H04N 19/98* (2014.01)
*H04N 9/64* (2006.01)
*H04N 5/57* (2006.01)

(52) U.S. Cl.
CPC .............. *G06T 2207/20208* (2013.01); *G09G 2320/0626* (2013.01); *G09G 2320/0666* (2013.01); *G09G 2320/0673* (2013.01); *G09G 2330/021* (2013.01); *G09G 2360/16* (2013.01)

(56) References Cited

U.S. PATENT DOCUMENTS

| 8,416,179 | B2 | 4/2013 | Kerofsky |
| 8,531,379 | B2 | 9/2013 | Kerofsky |
| 8,593,480 | B1 | 11/2013 | Ballestad |
| 9,330,630 | B2 | 5/2016 | Kerofsky |
| 9,514,508 | B2 | 12/2016 | Ballestad |
| 9,961,237 | B2 | 5/2018 | Atkins |
| 10,244,244 | B2 | 3/2019 | Piramanayagam |
| 10,540,920 | B2 * | 1/2020 | Atkins ..................... H04N 5/20 |
| 2006/0274026 | A1 | 12/2006 | Kerofsky |
| 2017/0061591 | A1 | 3/2017 | Park |
| 2019/0355314 | A1 | 11/2019 | Vernon |
| 2020/0005441 | A1 * | 1/2020 | Pytlarz ..................... G06T 5/009 |
| 2020/0404336 | A1 * | 12/2020 | Chen ..................... H04N 19/14 |

FOREIGN PATENT DOCUMENTS

| CN | 107995497 B | 5/2018 |
| JP | 2005293265 A | 10/2005 |
| JP | 2015233286 A | 12/2015 |
| WO | 2016098992 A1 | 6/2016 |
| WO | 2018132329 | 7/2018 |
| WO | 2018152063 | 8/2018 |

OTHER PUBLICATIONS

ITU-R BT. 2100 "Image Parameter Values for High Dynamic Range Television for Use in Production and International Programme Exchange" ITU, Jul. 2016.

ITU-R BT.2020-2 "Parameter Values for Ultra-High Definition Television Systems for Production and International Programme Exchange" Oct. 2015, p. 1-8.

ITU-R BT.709-6, "Parameter Values for the HDTV standards for Production and International Programme Exchange" Jun. 2015, pp. 1-19.

Smpte: "ST 2094-1:2016—SMPTE Standard—Dynamic Metadata for Color Volume Transform—Core Components", IEEE, Jun. 13, 2016, pp. 1-15.

* cited by examiner

DISPLAY MAPPING FOR HIGH DYNAMIC RANGE IMAGES ON POWER-LIMITING DISPLAYS

CROSS-REFERENCE TO RELATED APPLICATIONS

This application claims priority to U.S. Provisional Application No. 62/732,123 and European Patent Application No. 18194858.9, both filed on Sep. 17, 2018, each of which is incorporated by reference in its entirety.

TECHNOLOGY

The present invention relates generally to images. More particularly, an embodiment of the present invention relates to display mapping of high-dynamic range (HDR) images and video signals from a first dynamic range to a second dynamic range on power-limiting displays.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in ITU-R Rec. BT. 2100.

High Dynamic Range (HDR) content authoring is now becoming widespread as this technology offers more realistic and lifelike images than earlier formats. However, many display systems, including hundreds of millions of consumer-television displays, are not capable of reproducing HDR images. One approach being used to serve the overall market is to create two versions of new video content—one using HDR images, and another using SDR (standard dynamic range) images. However, this requires content authors to create their video content in multiple formats, and may require consumers to know which format to buy for their specific display. A potentially better approach might be to create one version of content on a reference HDR display, and use an image data transformation system (e.g., as part of a set-top box functionality) to automatically down-convert the HDR content to HDR or SDR content for compatibility with displays with a different dynamic range than the reference display. To improve existing display schemes, especially as they relate to power-limiting displays, as appreciated by the inventors here, improved techniques for mapping images from a first dynamic range into images of a second dynamic range are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
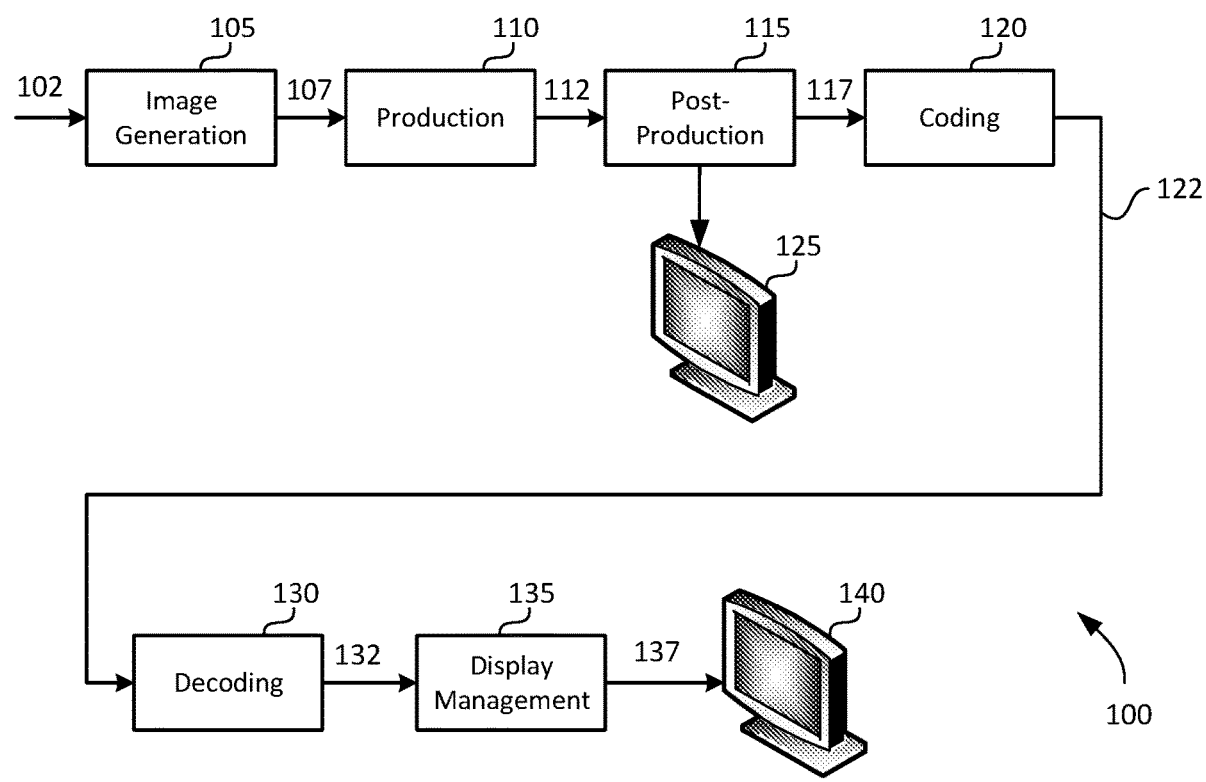
FIG. 1 depicts an example process for a video delivery pipeline.

Methods for mapping high dynamic range (HDR) images from a first dynamic range to a second dynamic range on power-limiting displays are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for mapping images from one dynamic range into images of a second dynamic range. In a first embodiment, an apparatus receives input metadata for an input image to be mapped on a target display from a first dynamic range to a second dynamic range, an APL function of the target display, wherein the APL function determines output luminance in the target display as a function of average picture level (APL) input in the target display, a minimum luminance level for the target display (Tmin) and a reference maximum luminance level for the target display (Tmax_ref). The apparatus determines a reference mid luminance level for the target display based on: the minimum luminance level of the target display, the reference maximum luminance level for the target display, and the input metadata (that is, by ignoring the APL function). It also determines based on the input metadata and the APL function of the target display a luminance versus candidate maximum luminance values (Tmax_c) function of the target display ($f_T$(Tmax_c)), wherein the luminance versus Tmax_c function determines output mid luminance in the target display as a function of candidate maximum luminance level inputs in the tone-mapping algorithm. Given a tone-mapping curve with an anchor point based on an adaptive maximum luminance level of the target display (Tmax_o), the apparatus determines Tmax_o based on the value of a candidate maximum luminance for which the output of $f_T$(Tmax_c) is closer to the reference mid luminance level of the target display.

In a second embodiment, an apparatus receives input metadata for an input image to be mapped on a target display from a first dynamic range to a second dynamic range, an APL function of the target display, wherein the APL function determines output luminance in the target display as a function of average picture level (APL) input in the target display, a minimum luminance level for the target display, and a reference maximum luminance level for the target display (Tmax_ref). The apparatus determines a reference mid luminance level for the target display based on the minimum luminance level of the target display, the reference maximum luminance level for the target display, and the input metadata. The apparatus also determines based on the input metadata and the APL function of the target display a luminance versus candidate P values function of the target display ($f_P$ (P_c)), wherein the $f_P$ (P_c) function determines output luminance in the target display as a function of candidate power factors (P_c). The apparatus determines an output power factor for the tone-mapping function of the target display based on a value of a candidate power factor for which the output of the $f_P$ (P_c) function is closer to the reference mid luminance level of the target display. The output power factor is then applied to a tone-mapping curve that was designed without taking into consideration the APL function of the target display to adapt the tone-mapping curve according to the power-limiting characteristics of the target display.

Dynamic Range Conversion

Video Coding of HDR Signals

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Image Transformation Using a Sigmoid Mapping

In U.S. Pat. No. 8,593,480, "Method and apparatus for image data transformation," by A. Ballestad and A. Kostin, to be referred herein as the '480 patent, which is incorporated herein by reference in its entirety, the inventors proposed an image transformation mapping using a parametrized sigmoid function that can be uniquely determined using three anchor points and a mid-tones free parameter. An example of such function is depicted in FIG. 2.

Figure 2:
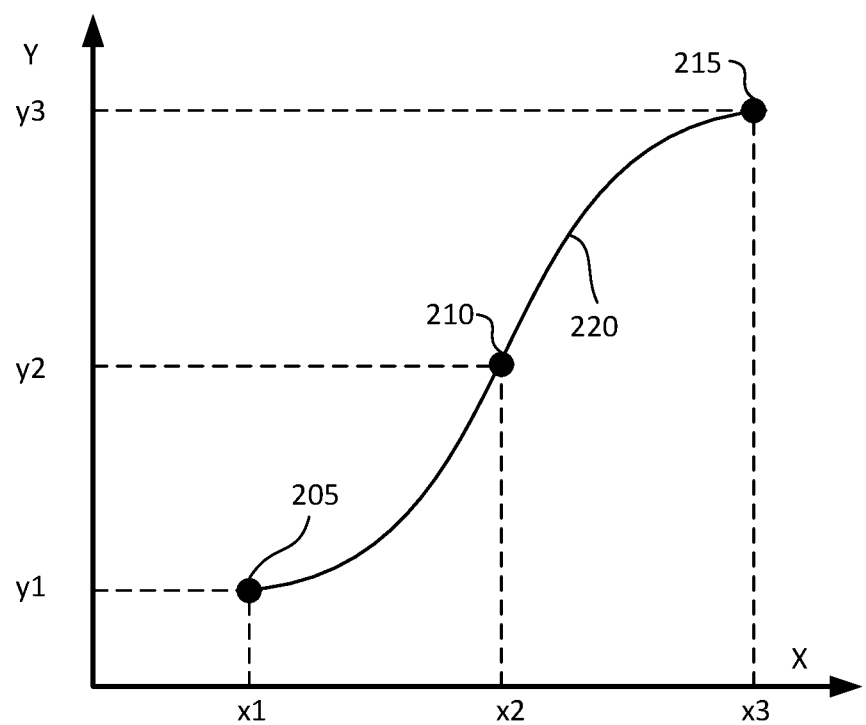
FIG. 2 depicts a first example mapping function for mapping images from a first dynamic range to a second dynamic range using three anchor points.

As depicted in FIG. 2, the mapping function (220) is defined by three anchor points (205, 210, 215): a black point (x1, y1), a mid-tones point (x2, y2), and a white point (x3, y3). This transformation has the following properties:

- The values from x1 to x3 represent the range of possible values that describe the pixels that make up the input image. These values may be the brightness levels for a particular color primary (R, G, or B), or may be the overall luminance levels of the pixel (say the Y component in a YCbCr representation). Typically, these values correspond to the darkest (black point) and brightest (white point) levels supported by the display used to create the content (the limits of the "mastering display" (125)); however, in some embodiments, when the characteristics of the reference display are unknown, these values may represent minimum and maximum values in the input image (e.g., in R, G, or B, luminance, and the like), which can be either received via image metadata or computed in the receiver.
- The values from y1 to y3 represent the range of possible values that describe the pixels that make up the output image (again either color primary brightness or overall luminance levels). Typically, these values correspond to the darkest (black point) and brightest (white point) levels supported by the intended output display (the limits of the "target display" (140)).
- Any input pixel with the value x1 is constrained to map to an output pixel with the value y1, and any input pixel with the value x3 is constrained to map to an output pixel with the value y3.
- The values of x2 and y2 represent a specific mapping from input to output that is used as an anchor point for some "midrange" (average or mid-tones level) element of the image. For example, this midrange may represent an arithmetic mean or average, a geometric mean, or some other value of interest (say, skin tones). Considerable latitude is permitted in the specific choice of x2 and y2, and the '480 patent teaches a number of alternatives for how these parameters may be chosen.

Once the three anchor points have been chosen, the transfer function (220) may be described as $$y = \frac{C_1 + C_2 x^n}{1 + C_3 x^n}, \quad (1)$$

where $C_1$, $C_1$, and $C_3$ are constants, x denotes the input value for a color channel or luminance, y denotes the corresponding output value, and n is a free parameter that can be used to adjust mid-tone contrast, and which, without loss of generality, herein will be considered to be set to one (n=1).

As described in the '480 patent, the $C_1$, $C_1$, and $C_3$ values may be determined by solving $$\begin{pmatrix} c_1 \\ c_2 \\ c_3 \end{pmatrix} = \frac{1}{x_3 y_3 (x_1 - x_2) + x_2 y_2 (x_3 - x_1) + x_1 y_1 (x_2 - x_3)} \quad (2)$$

$$\begin{pmatrix} x_2 x_3 (y_2 - y_3) & x_1 x_3 (y_3 - y_1) & x_1 x_2 (y_1 - y_2) \\ (x_3 y_3 - x_2 y_2) & (x_1 y_1 - x_3 y_3) & (x_2 y_2 - x_1 y_1) \\ (x_3 - x_2) & (x_1 - x_3) & (x_2 - x_1) \end{pmatrix} \begin{pmatrix} y_1 \\ y_2 \\ y_3 \end{pmatrix}.$$

Figure 3:
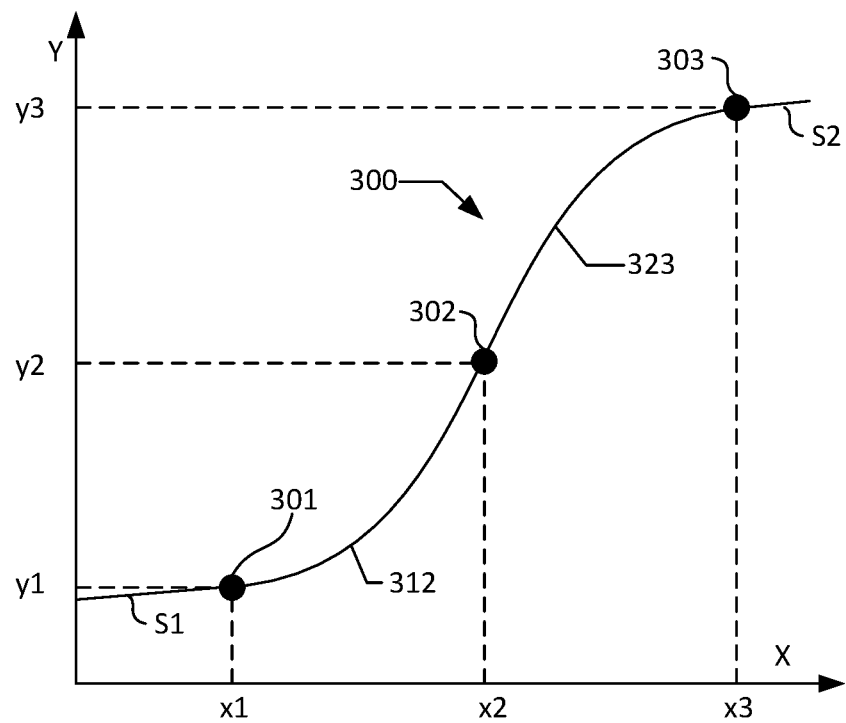
FIG. 3 depicts a second example mapping function for mapping images from a first dynamic range to a second dynamic range using three anchor points.

As described in PCT Patent Application PCT/US2018/017830, "Tone curve mapping for HDR images," filed on Feb. 12, 2018, and incorporated herein by reference, FIG. 3 is a graphical depiction of another example tone-mapping curve 300 for mapping images from a first dynamic range $[x_1, x_3]$ to a second dynamic range $[y_1, y_3]$, where $[x_1, x_3]$ are input channel values and $[y_1, y_3]$ are output channel values. Tone-mapping curve 300 includes a spline 312, from $(x_1, y_1)$ to $(x_2, y_2)$, and a spline 323, from $(x_2, y_2)$ to $(x_3, y_3)$. Tone-mapping curve 300 may also include at least one of a first linear segment S1, for values lower than $(x_1, y_1)$, and a second linear segment S2, for values larger than $(x_3, y_3)$. Minimum dynamic range value $x_1$ may be negative and maximum dynamic range value $x_3$ may exceed one. Segments S1 and S2 may be non-linear, without departing from the scope hereof. Each of splines 312 and 323 may be a polynomial, such as a Hermite polynomial, or any order, such as third-order.

Tone-mapping curve 300 intersects three anchor points 301, 302, and 303, the locations of which partly determine the shape of tone-mapping curve 300. Anchor points 301, 302, and 303 are located at respective coordinates $(x_1, y_1)$, $(x_2, y_2)$, and $(x_3, y_3)$, which respectively correspond to black points (e.g., xmin, Tmin), mid-tone value points (e.g., xmid, Tmid), and white points (e.g., xmax, Tmax) when channel values $x_i$ are input luminance values and Tmin, Tmid, and Tmax may denote the minimum, mid (or average), and maximum luminance values in a target display (e.g., 140).

In addition, each of the spline segments can be further constrained by two slopes, at each end-point; thus tone-mapping curve 300 is controlled by three anchor points (301, 302, and 303) and three slopes: the tail slope at $(x_1, y_1)$, the mid-tones slope at $(x_2, y_2)$, and the head slope at $(x_3, y_3)$.

As an example, consider a spline determined between points $(x_1, y_1)$ and $(x_2, y_2)$, with slope $m_1$ at $(x_1, y_1)$ and slope $m_2$ at $(x_2, y_2)$, then, for an input x the transfer function for that cubic Hermite spline may be defined in equation (3) below, where $$T = (x - x_1)/(x_2 - x_1);$$

$$y = (2T^3 - 3T^2 + 1)y_1 + (T^3 - 2T^2 + T)(x_2 - x_1)m_1 + (-2T^3 + 3T^2)y_2 + (T^3 - T^2)(x_2 - x_1)m_2. \quad (3)$$

Power-Limiting Displays

The majority of displays in the market today dim as the average picture level (APL) of the input signal increases. This is most often due to power limiting or lifetime concerns. When there are many bright pixels, the total amount of power needed to display the image increases, so the power must be distributed amongst the pixels, typically by lowering the average luminance across the image. In a conventional display management process (135), one typically assumes a constant target maximum luminance level (Tmax). Such mapping may not accurately represent the director's intent since when an image is too bright, the actual Tmax value supported by the display may be lower, hence the displayed image will be darker. In this invention, a novel method is proposed to determine Tmax by also taking into consideration the TV's power limiting characteristics. The proposed scheme yields pictures that match more faithfully the director's intent as captured by the image generated on the reference display (125) where normally there is no power limiting.

Display Luminance as a Function of Average Picture Level (APL)

Each display model has its own power limiting characteristics. To characterize the power limiting characteristics of a display, one may measure the luminance of the display per APL input. This is found using a set of test patterns where the entire image is set to one code value. For example, a display that is completely red, green, or blue is considered 33% APL. These test patterns can be in a range from 0-100%. An example measurement of display luminance (in nits) as a function of APL percentage input is given in FIG. 4.

Figure 4:
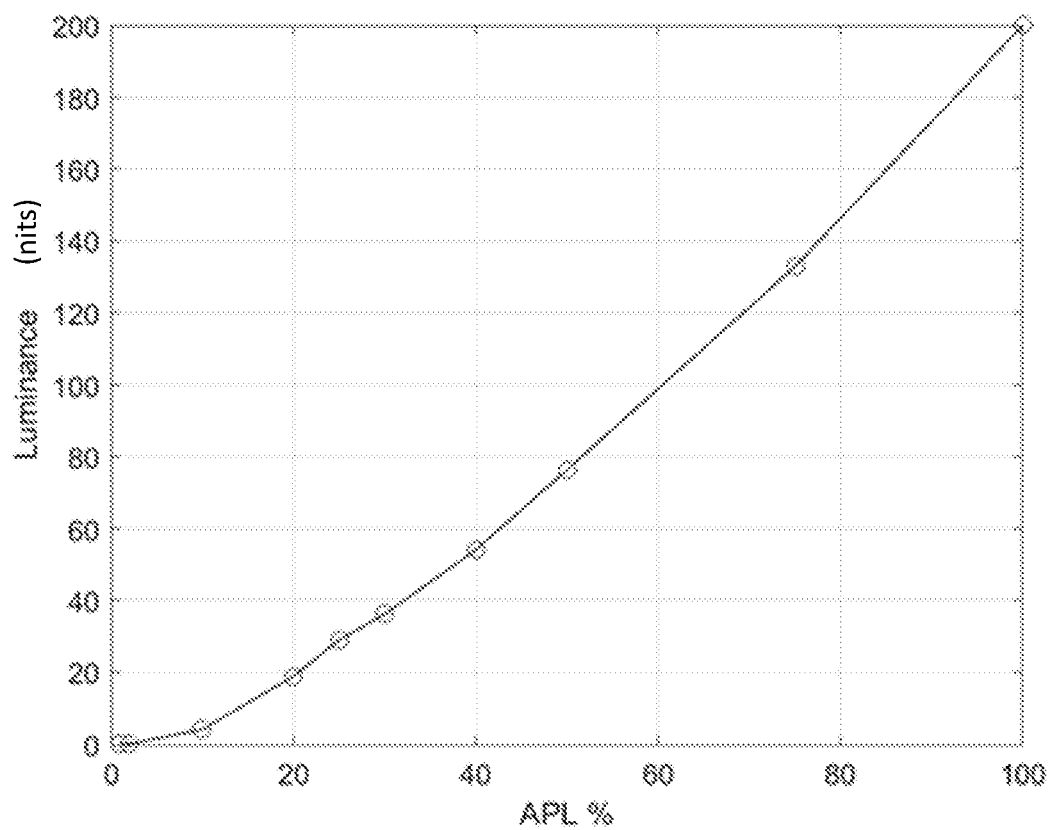
FIG. 4 depicts an example plot of output luminance versus input average picture level (APL)
Figure 5:
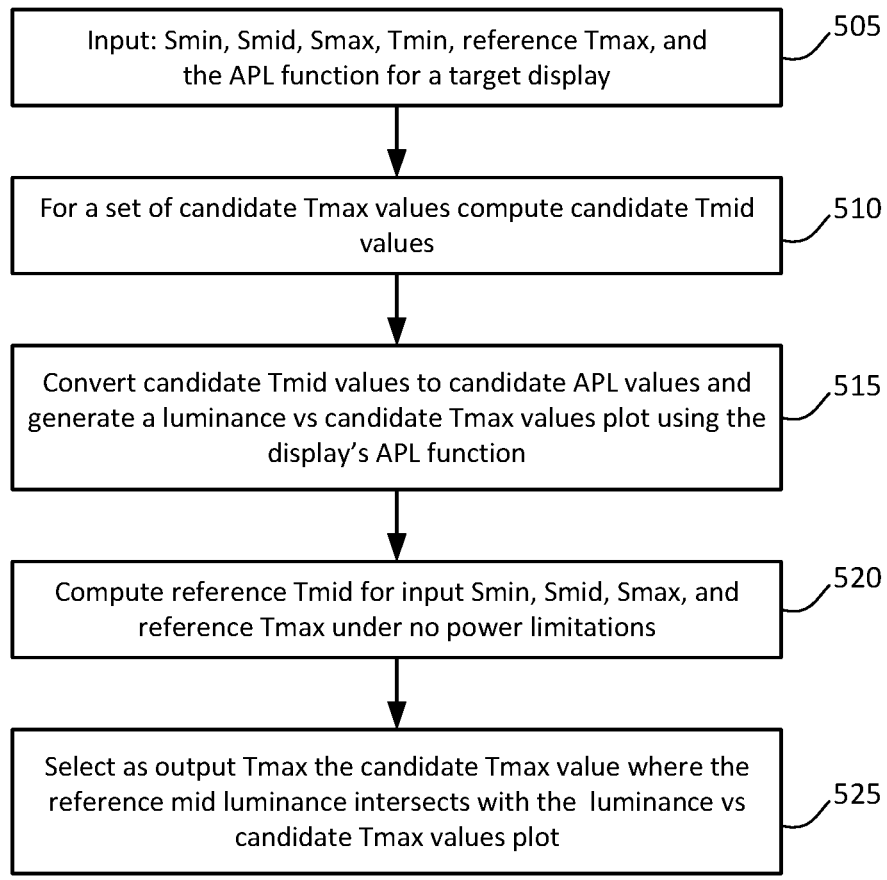
FIG. 5 depicts an example process for determining an adaptive output Tmax value for power-limiting displays according to an embodiment.

Such a plot provides a physical characteristic of the panel and can be used to define a more accurate value of Tmax. In practice, the plot data may be saved in a display configuration file (along with other typical panel properties). Depending on the application, for better computational efficiency, the Y axis (e.g., luminance) may be represented in gamma luminance or PQ luminance values instead of linear luminance Generating Adaptive Tmax Values FIG. 5 depicts an example process for generating adaptive output Tmax values according to an embodiment. In step 505, the process starts by accessing the input metadata Smin, Smid, and Smax, and the target display characteristics. The target display characteristics may include the display's luminance as a function of input APL (e.g., an APL function as depicted in FIG. 4) and Tmin and reference Tmax values (denoted as Tmin_ref and Tmax_ref) assuming no power limitations. The goal of this process is to identify the best value for setting Tmax to derive a display management mapping function (e.g., 220 or 300) to maintain the director's intent when mapping the input data (e.g., 132) to the target display (140).

In step 510, the process selects a set of candidate Tmax values (to be denoted as Tmax_c(i)). For example, without limitation, for Tmax_ref=650 nits, the set of Tmax_c(i) values may be {300, 500, 650, 1200, 1900}. Note that 1,200 and 1,900 are actually higher than Tmax_ref=650. This is fine, because such values may actually yield a more accurate mapping curve—which is actually the ultimate goal. Then, for each of these candidate Tmax_c(i) values, given Smin, Smid, Smax, and Tmin, step 510 computes candidate Tmid values (denoted as Tmid_c(i)). That is, the process selects y2 values of the mid anchor points as depicted in FIG. 2 and FIG. 3. Examples of generating a Tmid value given the characteristics of the input and a target display can be found in PCT Application Ser. No. PCT/US2018/012780, filed on Jan. 8, 2018, "Display Mapping for High Dynamic Range Images," which is incorporated herein by reference. As an example, and without limitation, using Matlab-like code, Tmid_c(i) values may be computed as follows:

```
cutoff(i) = DM_CalcCuttoff(Smin,Smid,Smax,TminPQ,TmaxPQ_c(i));
Tmid_c(i) = Smid - (Smid-min(Smid, TmaxPQ_c(i)-min((Smax-Smid),
(4) TmaxPQ_c(i)-cutoff(i)))) + (max(Smid, TminPQ+min((Smid-Smin),
cutoff(i)-TminPQ))-Smid).
```

TmaxPQ, TminPQ, and TmaxPQ_c(i) denote PQ-coded luminance values corresponding to the linear luminance values Tmax, Tmin, and Tmax_c(i), which have been converted to PQ luminance using SMPTE ST 2084. Functions min( ) and max( ) output, respectively, the minimum and maximum values of their arguments. For example, min (a, b)=a if b>a, and max(a, b)=b if a<b.

In an embodiment, the function DM_CalcCuttoff( ) is defined as:

```
cutoff = DM_CalcCuttoff(SMin,SMid,SMax,TminPQ,TmaxPQ)
% Set the offset curve parameters
preservationHead = 0.1;
preservationTail = 0.02;
rollStart = 0.1;
% Calculate the offset curve parameters
converge = TminPQ + rollStart;
minPt = min(TminPQ,SMin);
maxPt = max(TmaxPQ,SMax);
tgtMax = max(converge,TmaxPQ-preservationHead);
tgtMin = min(converge,TminPQ + preservationTail);
STC = maxPt - converge;
TTC = tgtMax - converge;
SBC = converge - minPt;
TBC = converge - tgtMin;
maxMinSlope = max(0,3*(converge-tgtMin)./ (converge-minPt));
maxMaxSlope = max(0,3*(tgtMax-converge) / (maxPt-converge));
slopeMid = min([maxMinSlope,maxMaxSlope, (TmaxPQ-TminPQ) ./0.5, 1]);
slopeMin = min([maxMinSlope,1,(TBC/SBC)^2]);
slopeMax = min([maxMaxSlope,1,(TTC/STC)^2]);
%Top Rolloff
slope = [slopeMid,slopeMax];
points = [converge,converge;maxPt,tgtMax];
T = (SMid-points(1,1)) / (points(2,1)-points(1,1));
cutoff = (SMid>converge) .* ((2*T.^3*T.^2 + 1)*points(1,2) +
(T.^3 - 2*T.^2 + T)*(points(2,1)-points(1,1))*slope(1) + (-2*T.^3 +
3*T.^2)*points(2,2) + (T.^3 - T.^2)*(points(2,1)-
points(1,1))*slope(2));
%Bottom Rolloff
slope = [slopeMin,slopeMid];
points = [minPt,tgtMin;converge,converge];
T = (SMid-points(1,1)) / (points(2,1)-points(1,1));
cutoff = cutoff + (SMid<=converge) .* ((2*T.^3 - 3*T.^2 +
1)*points(1,2) + (T.^3 - 2*T.^2 + T)*(points(2,1)-
points(1,1))*slope(1) + (-2*T.^3 + 3*T.^2)*points(2,2) + (T.^3 -
T.^2)*(points(2,1)-points(1,1))*slope(2));
end
```

In step 515, the candidate Tmid_c(i) values are converted to candidate APL values (denoted as APL_c(i)). In an example, without limitation, this conversion can be performed using a linear luminance to BT. 1886 conversion, e.g.:

$$APL\_c(i) = L2BT1886(PQ2L(T\,mid\_c(i)), PQ2L(T\,\max\,PQ\_c(i)), PQ2L(T\,\min\,PQ), 2.2, 1), \quad (5)$$

where the function PQ2L(x) converts x from PQ-luminance to linear luminance, and the function L2BT18860, which converts linear luminance to gamma, can be expressed as:

```
function V = L2BT1886(L,a,b,g,computeab)
% Converts luminance to BT1886
    if exist('computeab') && computeab
        % Consider that a and b are actually tmax and tmin
        assert(g>1,'Invalid Gamma');
        Tmax = a; Tmin = b;
        a = (Tmax.^(1/g)-Tmin.^(1/g)).^g;
        b = Tmin.^(1/g) / (Tmax.^(1/g) - Tmin.^(1/g));
    end
    % SMPTE definition
    V = power(max(0,L / a), 1/g) - b;
end
```

Note: Using equation (5) assumes that to compute the APL response of the target display the input patches were converted by the display to BT. 1886 (gamma). In embodiments where that's not the case, this step can be replaced by the proper EOTF function being used to compute the APL response of the target display.

Given these APL_c(i) values and the APL function for the target display (e.g., $L=f_A(APL)$), one may compute a plot of luminance values for each of the candidate Tmax values. In summary, we have a mapping of $$T\,\max\_c(i) \rightarrow T\,mid\_c(i) \rightarrow APL\_c(i) \rightarrow L(i) = f_A(APL\_c(i)), \quad (6)$$

which is used to generate a luminance vs candidate Tmax values function (or look-up table and the like) of $L(i)=f_T(Tmax\_c(i))$. An example of such a mapping is depicted as plot 610 in FIG. 6.

Step 520 repeats steps 510 and 515, but now just for the Tmax_ref value and under no power limitations. That is, instead of using $f_A(\ )$, Luma (e.g., PQ-coded luminance) values are converted directly to linear luminance using the display's EOTF (e.g., by using the PQ2L( ) function for PQ-coded images). For example, as in equation (4), the reference mid luminance value Tmid_ref value may be computed as:

cutoff = DM_CalcCuttoff(Smin,Smid,Smax,TminPQ,TmaxPQ);
Tmid ref = Smid − (Smid-min(Smid, TmaxPQ−min((Smax−Smid), TmaxPQ − cutoff))) + (max(Smid, TminPQ+min((Smid−Smin), cutoff−TminPQ))− (7) Smid);.

In an embodiment, step 520 may be part of the computations in steps 510 and 515.

Thus, as in equation (6), one has a direct association of L_ref as a function of Tmax_ref:

$$T\max\_ref \rightarrow T\text{mid}\_ref \rightarrow L\_ref = PQ2L(T\text{mid}\_ref). \qquad (8)$$

Figure 6:
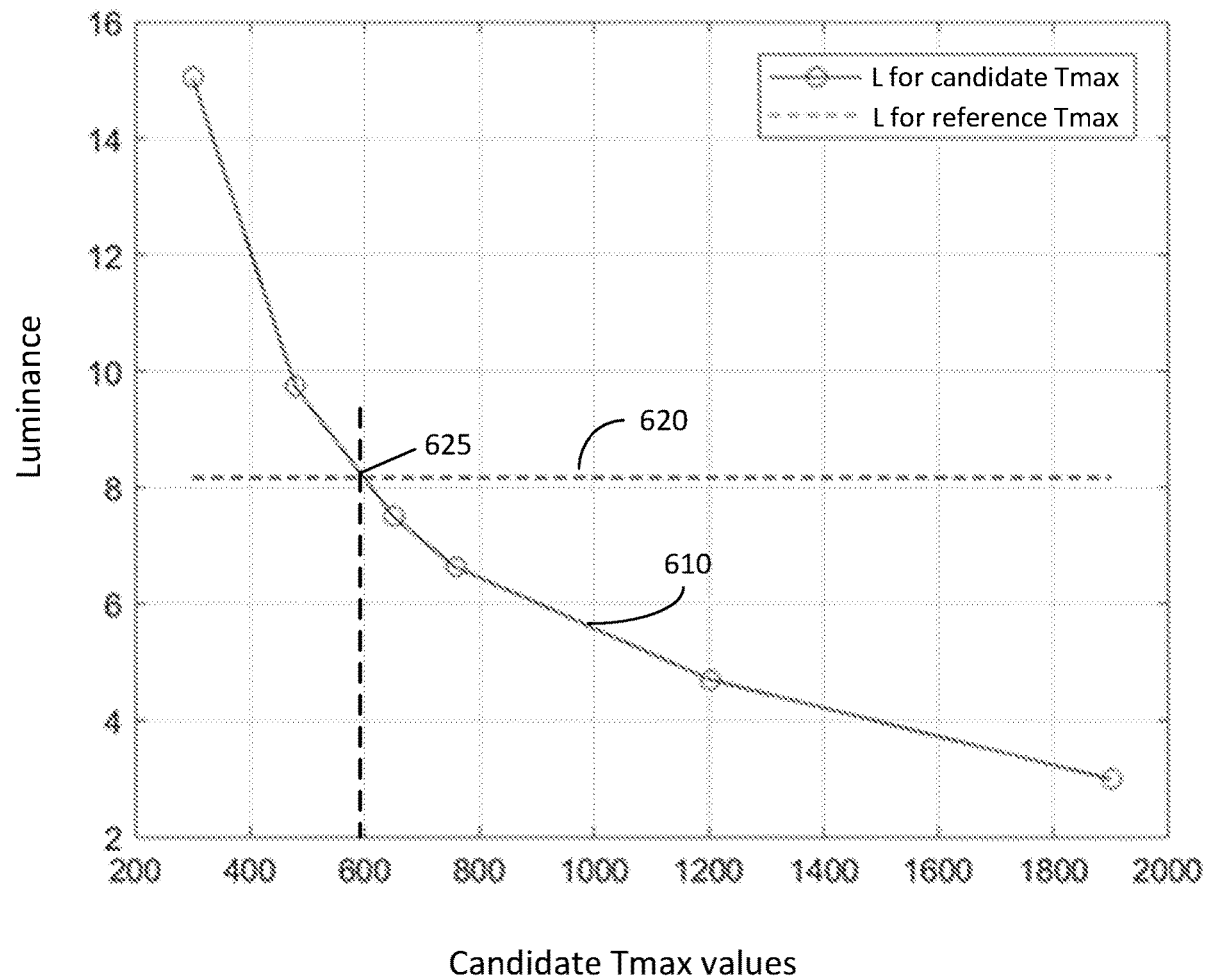
FIG. 6 depicts example data according to the example process depicted in FIG. 5.

An example of such a mapping is shown in FIG. 6 as line 620.

Given L_ref and $L=f_T(Tmax\_c)$, in an embodiment, the output Tmax (e.g., Tmax_o) value to be used in generating the tone-mapping curve is the one where $L\_ref \cong f_T(Tmax\_c)$. As noted in step 525, this corresponds to the Tmax_c value for which $f_T$ (Tmax_c) intersects the reference mid luminance level value L=L_ref. For example, in FIG. 6 (generated for a 650 nit TV), the intersection point (625) corresponds to an output Tmax value of Tmax_o=600 nits. From an implementation point of view, given that $f_T$ (Tmax_c) is typically determined using a limited set of Tmax_c(i) points, missing $f_T(\ )$ values may be derived using known interpolation techniques.

Post-Processing Optimization

In an embodiment, instead of solving for the optimum output Tmid and Tmax values based on the APL characteristics of a target display, one may compute the tone-mapping curve as if there is no power limitation (e.g., by using the reference Tmid_ref and Tmax_ref values), but then apply a post-processing step to adjust the curve based on the APL characteristics. For example, in an embodiment, given a power adjustment P factor, Tmid may be adjusted as follows:

$X=(T\text{mid}\_ref - T\min PQ)/(T\max PQ - T\min PQ),$ $Y=X^P,$ $T\text{mid}=Y*(T\max PQ - T\min PQ)+T\min PQ, \qquad (9)$ where, as before, TminPQ and TmaxPQ denote the reference minimum and maximum luminance values of the target display expressed in the PQ domain.

Figure 7:
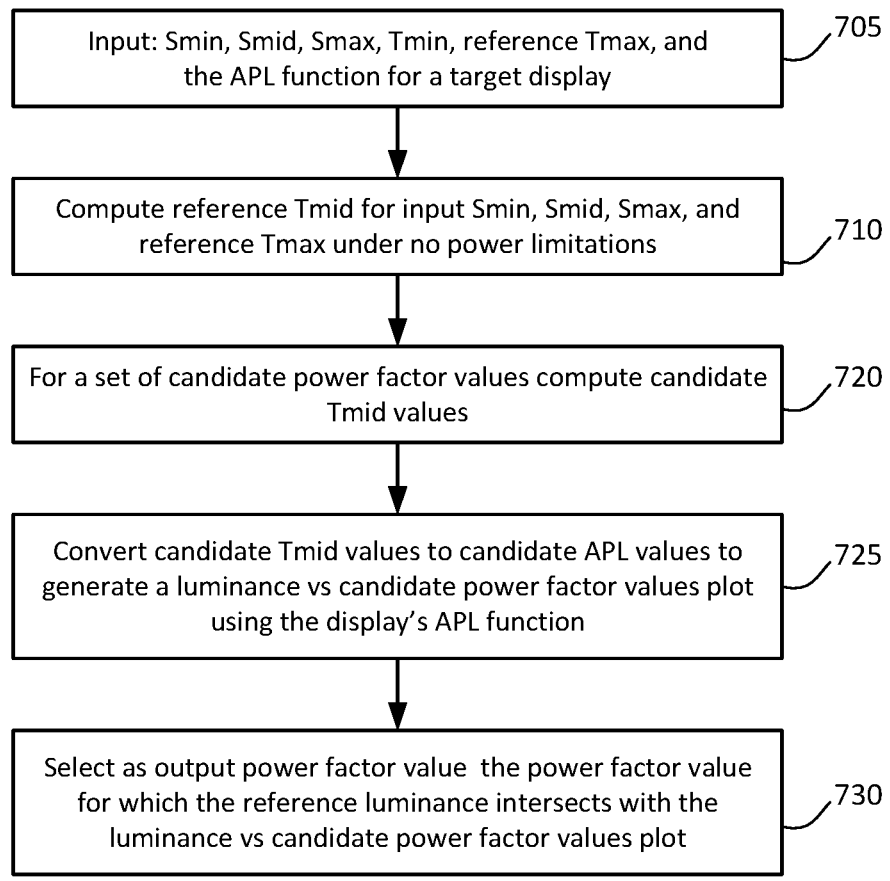
FIG. 7 depicts an example process for determining a power adjustment value for post-adjusting the display tone-mapping curve in power-limiting displays according to an embodiment.

FIG. 7 depicts an example process for computing the optimum power adjustment value P according to an embodiment. Step 705 is identical to step 505. Given the characteristics of the input data and the target display, step 710 is also identical to previously discussed step 520 to generate a reference mid luminance value $L\_ref=f_T$ (Tmax_ref) when there is no power limitation.

Step 720 replaces previously discussed step 510. Instead of using candidate Tmax_c(i) values, in step 720, one: a) defines a set of candidate power factor values P_c(i) and b) for each P_c(i) value applies equation (9) to compute candidate Tmid_c(i) values. For example, and without limitation, P_c(i) values may range from 0.75 to 1.25 at increments of 0.1.

Given the candidate Tmid_c(i) values computed in step 720, as in step 515, step 725 converts the Tmid_c(i) values into candidate APL values APL_c(i) to generate a luminance versus candidate P values function (e.g., $L=f_P$ (P_c). Thus, the mapping process in equation (6) is now replaced by the mapping process of:

$$P\_c(i) \rightarrow T\text{mid}\_c(i) \rightarrow APL\_c(i) \rightarrow L(i)=f_A(APL\_c(i)), \qquad (10)$$

Finally, in step 730, Given L=L_ref and $L=f_P$ (P_c), in an embodiment, the output P value to be used (e.g., P_o) is the P_c value for which $L\_ref \cong f_P$ (P_c). This corresponds to the P_c value for which $f_P$ (P_c) intersects the L=L_ref value.

Given a tone-mapping curve (x) $Y=f_{Tmax\_ref}(x)$ designed based on Tmin_ref, Tmax_ref, Smin, Smid, Smax, and P_o, the curve may be adjusted to take into consideration the power-limiting APL function of the target display as:

$$Y=(f_{Tmax_{ref}}(x))^{P\_o}. \qquad (11)$$

If needed, before applying the power function, as in equation (9), the tone-mapping curve should be normalized first so its input x is between [0,1].

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to mapping methods, such as those described herein. The computer and/or IC may compute, any of a variety of parameters or values that relate to reducing banding artifacts as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement mapping methods as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to mapping images from a first dynamic range to a second dynamic range in power-limiting displays are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):
1. In an apparatus comprising one or more processors, a method for determining anchor points for a tone-mapping curve for power-limiting displays, the method comprising:
  receiving input metadata for an input image to be mapped on a target display from a first dynamic range to a second dynamic range;
  receiving an APL function of the target display, wherein the APL function determines output luminance in the target display as a function of average picture level (APL) input in the target display;
  receiving a minimum luminance level for the target display and a reference maximum luminance level for the target display;
  determining a reference mid luminance level for the target display based on: the minimum luminance level of the target display, the reference maximum luminance level for the target display, and the input metadata;
  determining based on the input metadata and the APL function of the target display a luminance vs candidate maximum luminance values (Tmax_c) function of the target display, wherein the luminance versus Tmax_c values function determines output luminance in the target display as a function of a candidate maximum luminance level input in the target display; and
  determining an output maximum luminance level of the target display based on a Tmax_c value for which the output of the luminance versus Tmax_c values function is closer to the reference mid luminance level of the target display.
2. The method of EEE 1, wherein the input metadata comprise Smin, Smid, and Smax values, wherein Smin denotes the minimum luminance pixel value of the input image, Smid denotes a medium or average luminance pixel value of the input image, and Smax denotes the maximum luminance pixel value of the input image.
3. The method of EEE 2, wherein for a tone-mapping curve mapping the input image to the target display, a first anchor point of the tone-mapping curve comprises the Smin value and the minimum luminance level of the target display and a second anchor point of the tone-mapping curve comprises the Smax value and the output maximum luminance level of the target display.
4. The method of any of EEEs 1-3, wherein determining the reference mid luminance level for the target display comprises:
  generating a mid-reference PQ luminance value for the target display based on the input metadata, the minimum luminance level, and the reference maximum luminance level for the target display; and
  converting the mid reference PQ luminance to a linear mid luminance level by using a PQ-to-linear luminance mapping function.
5. The method of any of EEEs 1-4, wherein determining the luminance versus Tmax_c values function for the target display comprises:
  determining a set of two or more candidate maximum luminance values;
  for a candidate maximum luminance value (Tmax_c(i)) in the set of candidate maximum luminance values:
    generating a candidate mid luminance value for the target display based on the input metadata, the minimum luminance level and the candidate maximum luminance level of the target display; and
    generating an output luminance level for the Tmax_c(i) value based on the candidate mid luminance value and the APL function of the target display.
6. In an apparatus comprising one or more processors, a method for determining a power factor to adapt a tone-mapping curve according to the power-limiting characteristics of a target display, the method comprising:
  receiving input metadata for an input image to be mapped on a target display from a first dynamic range to a second dynamic range;
  receiving an APL function of the target display, wherein the APL function determines output luminance in the target display as a function of average picture level (APL) input in the target display;
  receiving a minimum luminance level for the target display and a reference maximum luminance level for the target display;
  determining a reference mid luminance level for the target display based on the minimum luminance level of the target display, the reference maximum luminance level for the target display, and the input metadata;
  determining based on the input metadata and the APL function of the target display a luminance versus candidate P factor values (P_c) function of the target display, wherein the luminance versus P_c values function determines output luminance in the target display as a function of candidate power factors; and
  determining an output power factor for the target display based on a value of a candidate power factor for which the output of the luminance versus P_c values function is closer to the reference mid luminance level of the target display.
7. The method of EEE 6, wherein the input metadata comprise Smin, Smid, and Smax values, wherein Smin denotes the minimum luminance pixel value of the input image, Smid denotes a medium or average luminance pixel value of the input image, and Smax denotes the maximum luminance pixel value of the input image.
8. The method of EEE 6 or EEE 7, wherein determining the reference mid luminance level for the target display comprises:

generating a mid reference PQ luminance value for the target display based on the input metadata, the minimum luminance level, and the reference maximum luminance level for the target display; and converting the mid reference PQ luminance to a linear mid luminance level by using a PQ-to-linear luminance mapping function.

9. The method of any of EEEs 6-8, wherein determining the luminance vs P_c values function for the target display comprises:

determining a set of two or more candidate power factor values;

for a candidate power factor value (P_c(i)) in the set of candidate power factor values:

generating a candidate mid luminance value for the target display based on the input metadata, the minimum luminance level, the maximum luminance level, and the candidate power factor value of the target display;

generating an output luminance level for the P_c(i) value based on the candidate mid luminance value and the APL function of the target display.

10. The method of any of EEEs 6-9 further comprising:

determining a first tone-mapping curve mapping the input image to the target display based on the minimum luminance level of the target display, the reference maximum luminance level for the target display, and the input metadata; and adjusting the first tone-mapping curve based on the output power factor.

11. The method of EEE 10, wherein adjusting the first tone-mapping curve comprises raising the output of the first tone-mapping curve to the power of the output power factor for all input values to the first tone-mapping curve.

12. A non-transitory computer-readable storage medium having stored thereon computer-executable instructions for executing with one or more processors a method in accordance with EEEs 1-11.

13. An apparatus comprising a processor and configured to perform any one of the methods recited in EEEs 1-11.

The invention claimed is:

1. A method for generating a display-mapped image using a tone-mapping curve with a first anchor point and a second anchor point, the method comprising:

receiving an input image to be mapped on a target display from a first dynamic range to a second dynamic range using a tone-mapping curve;

receiving input metadata for the input image, wherein the input metadata comprise a minimum luminance pixel value of the input image (Smin), a medium or average luminance pixel value of the input image (Smid), and a maximum luminance pixel value of the input image (Smax);

receiving an average picture level (APL) function of the target display, wherein the APL function determines output luminance in the target display as a function of APL input in the target display;

receiving a minimum luminance level for the target display (Tmin) and a reference maximum luminance level for the target display (Tmax_ref); and mapping the input image from the first dynamic range to the second dynamic range using the tone-mapping curve with (Smin, Tmin) as the first anchor point and (Smax, Tmax) as the second anchor point, wherein determining the Tmax value in the second anchor point comprises:

determining a reference mid luminance level value for the target display (L_ref) based on the input metadata, the Tmin value, and the Tmax_ref value;

for two or more candidate maximum luminance values (Tmax_c(i)) for the target display computing corresponding APL luminance values (L(i)) based on the input metadata, the two or more candidate maximum luminance values, and the APL function of the target display; and determining the Tmax value based on a candidate luminance value Tmax_c value for which its corresponding APL luminance value is approximately equal to the reference mid luminance level value for the target display (L_ref).

2. The method of claim 1, wherein determining the reference mid luminance level for the target display comprises:

generating a mid-reference PQ luminance value for the target display based on the medium or average luminance pixel value of the input image, the minimum luminance level for the target display, and the reference maximum luminance level for the target display; and converting the mid reference PQ luminance value to the reference mid luminance level by using a PQ-to-linear luminance mapping function.

3. The method of claim 1, wherein computing an APL luminance value (L(i)) corresponding to a candidate maximum luminance value Tmax_c(i) comprises:

generating a candidate mid luminance value for the target display (Tmid_c(i)) based on the medium or average luminance pixel value of the input image, the minimum luminance level for the target display and the candidate maximum luminance value; and generating the APL luminance value corresponding to the Tmax_c(i) value based on the candidate mid luminance value and the APL function of the target display.

4. A non-transitory computer-readable storage medium having stored thereon computer-executable instructions for executing with one or more processors a method in accordance with claim 1.

5. An apparatus comprising a processor and configured to perform the method recited in claim 1.

6. A method for generating a display-mapped image using a tone-mapping curve with a first anchor point and a second anchor point, the method comprising:

receiving for an input image to be mapped on a target display from a first dynamic range to a second dynamic range using a tone-mapping curve;

receiving input metadata for the input image, wherein the input metadata comprise a minimum luminance pixel value of the input image (Smin), a medium or average luminance pixel value of the input image (Smid), and a maximum luminance pixel value of the input image (Smax);

receiving an average picture level (APL) function of the target display, wherein the APL function determines output luminance in the target display as a function of APL input in the target display;

receiving a minimum luminance level for the target display (Tmin) and a reference maximum luminance level for the target display (Tmax_ref); and mapping the input image from the first dynamic range to the second dynamic range using the tone-mapping curve with (Smin, Tmin) as the first anchor point and (Smax, Tmax_ref) as the second anchor point, wherein the tone-mapping curve is further adjusted using an output power factor P, wherein computing the output power factor P comprises:

determining a reference mid luminance level value for the target display (L_ref) based on the input metadata, the Tmin value, and the Tmax_ref value;

for two or more candidate power factor values (P_c(i)) computing corresponding APL luminance values (L(i)) based on the input metadata, the two or more candidate power factor values, and the APL function of the target display; and determining the output power factor P based on a candidate power factor P_c value for which its corresponding APL luminance value is approximately equal to the reference mid luminance level value for the target display (L_ref).

7. The method of claim 6, wherein determining the reference mid luminance level for the target display comprises:

generating a mid reference PQ luminance value for the target display based on the medium or average luminance pixel value of the input image, the minimum luminance level for the target display, and the reference maximum luminance level for the target display; and converting the mid reference PQ luminance to the reference mid luminance level by using a PQ-to-linear luminance mapping function.

8. The method of claim 6, wherein computing an APL luminance value (L(i)) corresponding to a candidate power factor value (P_c(i)) comprises:

generating a candidate mid luminance value for the target display (Tmid_c(i)) based on the medium or average luminance pixel value of the input image, the minimum luminance level for the target display, the reference maximum luminance level of the target display, and the candidate power factor value; and generating the APL luminance value corresponding to the P_c(i) value based on the candidate mid luminance value and the APL function of the target display.

9. The method of claim 6, wherein adjusting the tone-mapping curve comprises raising the output of the tone-mapping curve to the power of the output power factor.

* * * * *

UNITED STATES PATENT AND TRADEMARK OFFICE
CERTIFICATE OF CORRECTION

| | |
|---|---|
| PATENT NO. | : 11,361,699 B2 |
| APPLICATION NO. | : 17/276752 |
| DATED | : June 14, 2022 |
| INVENTOR(S) | : Jaclyn Anne Pytlarz |

It is certified that error appears in the above-identified patent and that said Letters Patent is hereby corrected as shown below:

In the Claims

Column 14, Line 48, In Claim 6, after "receiving", delete "for".

Signed and Sealed this
Thirtieth Day of July, 2024

*Katherine Kelly Vidal*

Katherine Kelly Vidal
*Director of the United States Patent and Trademark Office*